US009475494B1

(12) United States Patent
MacArthur

(10) Patent No.: US 9,475,494 B1
(45) Date of Patent: Oct. 25, 2016

(54) VEHICLE RACE TRACK DRIVING ASSISTANCE

(71) Applicant: TOYOTA MOTOR ENGINEERING & MANUFACTURING NORTH AMERICA, INC., Erlanger, KY (US)

(72) Inventor: Robert C. MacArthur, Ypsilanti, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 14/707,358

(22) Filed: May 8, 2015

(51) Int. Cl.
  *B60W 10/04* (2006.01)
  *B60W 10/18* (2012.01)
  *B60W 10/20* (2006.01)
  *B60W 30/18* (2012.01)

(52) U.S. Cl.
  CPC .............. *B60W 30/18* (2013.01); *B60W 10/04* (2013.01); *B60W 10/18* (2013.01); *B60W 10/20* (2013.01); *B60W 2300/28* (2013.01); *B60W 2550/20* (2013.01); *B60W 2710/0605* (2013.01); *B60W 2710/18* (2013.01); *B60W 2710/20* (2013.01)

(58) Field of Classification Search
  CPC .... B60W 10/04; B60W 10/18; B60W 10/20; B60W 30/18
  USPC .......................................................... 701/41
  See application file for complete search history.

(56) References Cited

U.S. PATENT DOCUMENTS

| 7,043,342 | B1 | 5/2006 | Dewees |
| 7,486,175 | B2 | 2/2009 | Suzuki et al. |
| 7,561,966 | B2 | 7/2009 | Nakamura et al. |
| 8,503,762 | B2 | 8/2013 | Ben Tzvi |
| 8,514,101 | B2 | 8/2013 | Mathieu et al. |
| 8,645,001 | B2 | 2/2014 | Basson et al. |
| 8,692,739 | B2 | 4/2014 | Mathieu et al. |
| 8,818,708 | B2 | 8/2014 | Mathieu et al. |
| 8,970,451 | B2 | 3/2015 | Nagasawa et al. |

(Continued)

FOREIGN PATENT DOCUMENTS

| DE | 19813300 A1 | 10/1999 |
| JP | H078624 B2 | 2/1995 |

(Continued)

OTHER PUBLICATIONS

Car News @ TopSpeed India. 2014. Upcoming Range Rover & Range Rover Sport to Get More Power & Technological Updates, posted on Jul. 11, 2014 by Riju Ganguly (downloaded Mar. 23, 2015 from http://www.topspeed.in/cars/news/upcoming-range-rover-range-rover-sport-to-get-more-power-technological-updates-ar154791.html).

*Primary Examiner* — John Q Nguyen
*Assistant Examiner* — Nadeem Odeh
(74) *Attorney, Agent, or Firm* — McDermott Will & Emery LLP

(57) ABSTRACT

A vehicle race track driving assistance system may include a location tracking system that tracks the location of the vehicle; a memory for holding race track data indicative of the shape and location of the race track, including a turn on the race track; a steering control system that controllably steers the vehicle; and a controller that causes the steering control system to controllably steer the vehicle into the turn on the race track when the location tracking system and race track data indicate that the vehicle is approaching the turn, the steering being in an amount that is insufficient to cause the vehicle to navigate through the turn without deviating from the race track.

25 Claims, 2 Drawing Sheets

(56) References Cited

U.S. PATENT DOCUMENTS

| | | |
|---|---|---|
| 2007/0279317 A1 | 12/2007 | Matsumoto et al. |
| 2008/0055192 A1 | 3/2008 | Nagano et al. |
| 2009/0135092 A1 | 5/2009 | Uematsu et al. |
| 2012/0224060 A1 | 9/2012 | Gurevich et al. |
| 2014/0176425 A1 | 6/2014 | Bae et al. |
| 2014/0268353 A1 | 9/2014 | Fujimura et al. |

FOREIGN PATENT DOCUMENTS

| | | |
|---|---|---|
| JP | 4033170 B2 | 1/2008 |
| KR | 101271235 B1 | 6/2013 |

VEHICLE RACE TRACK DRIVING ASSISTANCE

BACKGROUND

1. Technical Field

This disclosure relates to vehicle racing, race tracks, and vehicle guidance systems.

2. Description of Related Art

Racing a vehicle on a race track can be a challenging activity. It can require precise control of the vehicle in order to minimize lap times and prevent accidents. When approaching a turn, for example, the steering, throttling, and braking may all need to be precisely timed. Many drivers, particularly inexperienced drivers, may have difficulty achieving this precise timing.

SUMMARY

A vehicle race track driving assistance system may include a location tracking system that tracks the location of the vehicle; a memory for holding race track data indicative of the shape and location of the race track, including a turn on the race track; a steering control system that controllably steers the vehicle; and a controller that causes the steering control system to controllably steer the vehicle into the turn on the race track when the location tracking system and race track data indicate that the vehicle is approaching the turn, the steering being in an amount that is insufficient to cause the vehicle to navigate through the turn without deviating from the race track.

There may be a turning location at which the vehicle would normally initiate the turn to minimize its lap times on the track. The controller may cause the steering control system to controllably steer the vehicle before the vehicle reaches the turning location. The steering by the steering control system may be overridden by a manual steering system.

The vehicle race track driving assistance system may include a throttle control system that controls a throttle of the vehicle. The controller may cause the throttle control system to reduce the throttle of the vehicle when the location tracking system and race track data indicate that the vehicle is approaching the turn. The amount of reduction in the throttle may be insufficient to ensure that the vehicle will not lose traction when making the turn.

There may be a throttle location at which the vehicle would normally reduce its throttle before going into the turn to minimize its lap times on the track. The controller may cause the throttle control system to reduce the throttle of the vehicle before the vehicle reaches the throttle location. The reduction in the throttle may be overridden by a manual addition of throttle. The throttle may also be increased on corner exit.

The vehicle race track driving assistance system may include a brake control system that controllably brakes the vehicle. The controller may cause the brake control system to brake the vehicle when the location tracking system indicates that the vehicle is approaching the turn. The amount of the braking may be insufficient to ensure that the vehicle will not lose traction when making the turn.

There may be a braking location at which the vehicle would normally brake before going into the turn to minimize its lap times on the track. The controller may cause the brake control system to brake the vehicle before the vehicle reaches the braking location. The braking may be overridden by a manual brake.

The race track data may be indicative of the longitude and latitude of a sequential series of locations on the race track. The race track data may be indicative of the altitude of each of the sequential series of locations on the race track.

The location tracking system may include a GPS system and a camera system and use information from both to track the location of the vehicle.

The vehicle race track driving assistance system may include a display that displays an image of the vehicle superimposed on an image of the race track at the vehicle's location on the race track as the vehicle travels. The display may also display a race line showing the optimum path of the vehicle to minimize lap times. Different portions of the race line may be displayed in different colors, each of which may indicate how fast the vehicle should be traveling over the portion of the race line bearing the color. One color may indicate that the vehicle should reduce speed when traveling over the portion of the race line bearing the color; one color may indicate that the vehicle should increase speed when traveling over the portion of the race line bearing the color; and one color may indicate that the vehicle should maintain its speed when traveling over the portion of the race line bearing the color.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
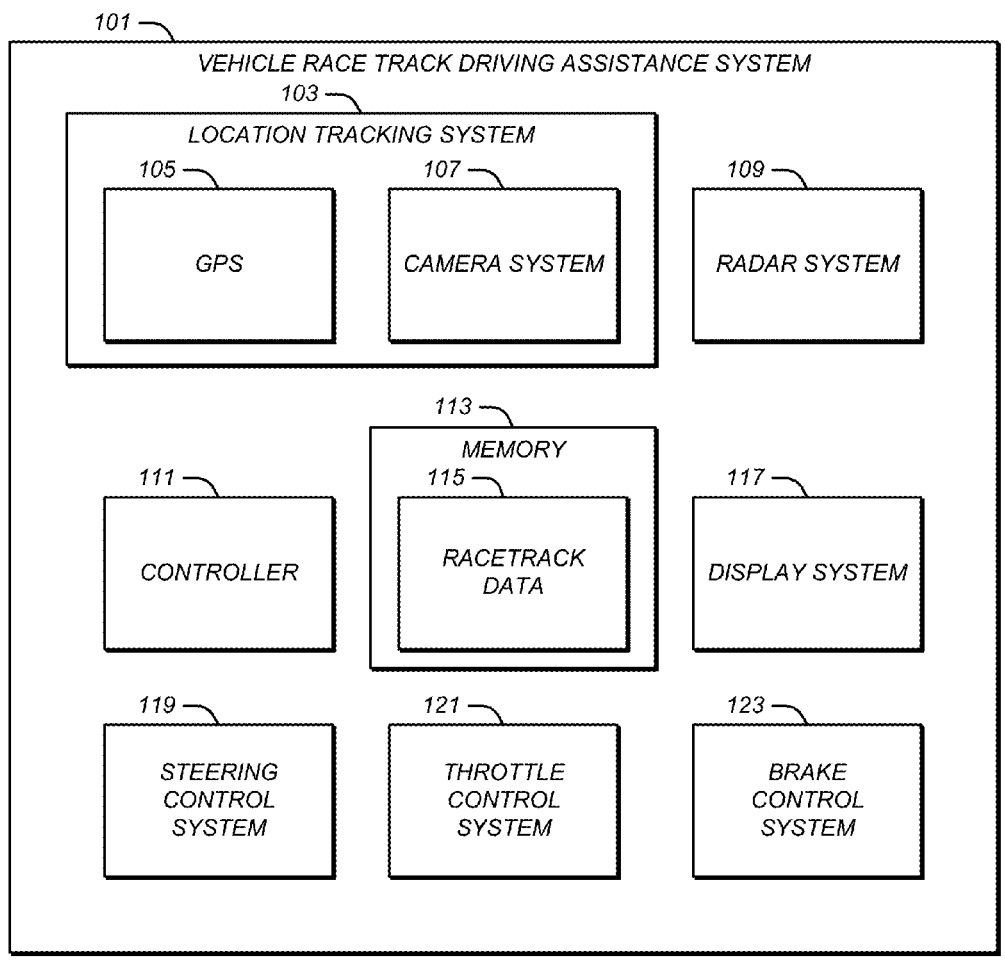
FIG. 1 illustrates an example of a vehicle race track driving assistance system.

FIG. 1 illustrates an example of a vehicle race track driving assistance system 101. The system may include a location tracking system 103, a radar system 109, a controller 111, a memory 113, a display system 117, a steering control system 119, a throttle control system 121, and a brake control system 123.

The location tracking system 103 may track the location of the vehicle, such as while the vehicle is traveling on a race track. The location tracking system 103 may include a global positioning system (GPS) 105 and a camera system 107.

The GPS 105 may provide information indicative of the location of the vehicle, such as its longitude, latitude, and/or altitude.

The camera system 107 may include one or more cameras that are attached to the vehicle and focused on the race track. The one or more cameras may face forward, rearward, to one or both sides of the vehicle, and/or in any other direction. The cameras may be directed toward the surface of the race track, such as to lane lines and curbing on each side of the vehicle, and/or one or more surrounding walls.

The location tracking system 103 may utilize the information from the camera system 107 to fine-tune the information from the GPS 105, thereby enhancing the accuracy of the location information provided by the GPS 105. For example, the GPS 105 may generally indicate the location of the vehicle, while the camera system 107 may provide information indicative of the precise location of the vehicle with respect to the race track, such as with respect to its surrounding walls and/or lane lines and curbing.

The steering control system 119 may be configured to controllably steer the vehicle under the command of the controller 111. For example, the steering control system 119 may be configured to cause the vehicle to turn, to sharpen a turn, and/or to soften a turn. The steering control system 119 may include a motor attached to the steering system (column, rack, etc.). The motor could provide the torque to the steering system to induce the steering input. At the point on the track that steering should occur, the control system 119 may provide input to the motor to apply torque to the steering system, causing the vehicle to turn.

The vehicle may also have a manual steering system, such as a steering wheel. The steering control system 119 may be configured to allow manipulation of the manual steering system to override any steering by the steering control system 119, including to reduce or to increase any steering by the steering control system 119.

The throttle control system 121 may be configured to controllably throttle the vehicle under the command of the controller 111. For example, the throttle control system 121 may be configured to increase or decrease the throttle of the vehicle. The throttle control system 121 may include a motor to pull a throttle cable or actuate a throttle plate directly. This could also be achieved by the throttle control system 121 sending a signal requesting an engine control unit to increase or limit output. The signal requesting output increase or limitation could be shared through a CAN bus.

The vehicle may also have a manual throttle, such as an accelerator pedal and/or a brake pedal. The throttle control system 121 may be configured to allow manipulation of the accelerator pedal and/or a brake pedal to override any throttle change initiated by the throttle control system 121. For example, the throttle control system 121 may be configured to allow any throttle input of the vehicle which it causes to be increased by depression of the accelerator pedal, decreased by depression of the brake pedal, or canceled by accelerator and/or brake pedal application by the driver.

The memory 113 may be an electronic or magnetic memory that is configured to hold race track data 115 indicative of the shape and location of the race track, including one or more turns on the race track. The race track data 115 may be downloaded to the memory from an external source, such as an Internet website, data provided by a race track, and/or a flash memory.

The race track data 115 may be in any form. For example, the race track data 115 may include the longitude, latitude, and/or altitude of a series of sequential locations on the race track. The sequential locations may be separated by any distance, such as a few inches or a few feet. The race track data 115 may include the coordinates of only one point for each location or multiple points, such as at the right and left sides of a lane on the race track at each location. The race track data 115 may include information indicative of the slope of the race track at each location, including its direction and/or magnitude.

The controller 111 may determine various characteristics of the vehicle from the location information from the location tracking system 103 and the race track data 115, such as the speed of the vehicle, its direction, its acceleration, and/or any other information needed to issue any of the commands discussed herein.

The controller 111 may utilize algorithms and/or data mapping tables to determine how the vehicle should be driven based on the location information from the location tracking system 103 and the race track data 115. For example, the controller 111 may utilize such algorithms and/or data mapping tables to determine the speed and direction of the vehicle at different locations on the race track that would most effectively minimize lap times, without allowing the vehicle to deviate from the race track or to travel in a dangerous manner.

For example, using these algorithms and/or data mapping tables, the controller 111 may determine that a turn is approaching and that the throttle soon needs to be reduced, brakes soon need to be applied, and that the vehicle soon needs to be steered into the turn. The controller 111 may determine that each of these things needs to be done at the same or at different times. The controller 111 may then control the steering control system 119, the throttle control system 121, and/or the brake control system 123 to effectuate these determined needs.

For example, the controller 111 may be configured to control the steering control system 119, the throttle control system 121, and/or the brake control system 123 in ways that signal to a driver of the vehicle when the driver should steer into a turn, decrease or increase the throttle, and/or apply or release the brakes to minimize the lap times on the track, while ensuring that control of the vehicle is not lost and that the vehicle does not deviate from the race track.

When approaching a turn on the race track, for example, the controller 111 may signal the steering control system 119 to initiate a turn. The controller 111 may signal the steering control system 119 to initiate the turn in an amount that is insufficient to cause the vehicle to navigate through the turn without deviating from the race track. For example, the controller 111 may signal the steering control system 119 to cause the vehicle to turn only between 5-10 or between 1-20 degrees when, in fact, a 30-90 degree turn is needed to travel through the turn without deviating from the race track.

The controller 111 may also cause the steering control system 119 to initiate the turn before the vehicle reaches the ideal turning location at which the vehicle would normally initiate the turn to minimize its lap times on the track. For example, the controller 111 may cause the steering control system 119 to initiate the turn a predetermined amount of time before reaching the ideal turning location that is approximately equivalent to the reaction time of a typical driver, such as between 0.2 and 0.4 or between 0.1 and 1.5 seconds before reaching the ideal turning location The vehicle driver may understand that initial turning by the steering control system 119 constitutes a signal that it is time for the driver to begin the next turn, thereby prompting the driver to quickly, and more sharply, turn the steering wheel.

When approaching the turn on the race track, for example, the controller 111 may also or instead signal the throttle control system 121 to reduce the throttle. The controller 111 may signal the throttle control system 121 to reduce the throttle in an amount that is insufficient to cause the vehicle to navigate through the turn without deviating from the race track. For example, the controller 111 may signal the throttle control system 121 to decrease the vehicle's speed by only 5-10 miles per hour or between 1 and 20 miles per hour when, in fact, a 30-60 mile per hour reduction in speed is needed to travel through the turn without deviating from the race track.

When exiting a turn of the race track, the controller 111 may also or instead signal the throttle control system 121 to increase the throttle.

The controller 111 may also cause the throttle control system 121 to reduce the throttle before the vehicle reaches the ideal throttle location at which the vehicle would normally reduce its throttle to minimize its lap times on the track. For example, the controller 111 may cause the throttle control system 121 to reduce the throttle a predetermined amount of time before reaching the ideal throttle location that is approximately equivalent to the reaction time of a typical race driver, such as between 0.2 and 0.4 or between 0.1 and 1.5 seconds before reaching the ideal turning location The vehicle driver may understand that the initial throttle reduction by the throttle control system 121 constitutes a signal that it is time for the driver to slow down, thereby prompting the driver to slow down more sharply by backing off of the throttle pedal and/or by braking.

When approaching a turn on the race track, for example, the controller 111 may signal the brake control system 123 to brake. The controller 111 may signal the brake control system 123 to brake in an amount that is insufficient to cause the vehicle to navigate through the turn without deviating from the race track. For example, the controller 111 may signal the brake control system 123 to cause the vehicle to only decrease the vehicle's speed by only 5-10 or between 1 and 20 miles per hour when, in fact, a 30-60 mile per hour reduction in speed is needed to travel through the turn without deviating from the race track.

The controller 111 may also cause the brake control system 123 to brake before the vehicle reaches the ideal braking location at which the vehicle would normally brake to minimize its lap times on the track. For example, the controller 111 may cause the brake control system 123 to brake a predetermined amount of time before reaching the ideal braking location that is approximately equivalent to the reaction time of a typical driver, such as between 0.2 and 0.4 or between 0.1 and 1.5 seconds before reaching the ideal braking location.

The vehicle driver may understand that the initial braking by the brake control system 123 constitutes a signal that it is time for the driver to brake, thereby prompting the driver to quickly and more sharply brake the vehicle.

The display system 117 may include one or more displays, such as a heads-up display on a front windshield of the vehicle. The display system may display an image of the vehicle superimposed on an image of the race track at the vehicle's location on the race track as the vehicle travels. Information from the location tracking system 103 and the race track data 115 may be used to generate the desired imagery.

The display system 117 may also display a racing line indicating the pathway on the race track that the vehicle should take to minimize its race time. This pathway may be computed based on information from the location tracking system 103 and the race track data 115. The pathway may also be computed based on algorithms and/or data maps that provide information about this optimum pathway based on the speed of the vehicle, the direction of its travel, the contour of the race track, and other information, as is familiar to race track drivers. The necessary computations and imagery may be generated by the controller 111 or by another computational system.

The display system 117 may cause different portions of the race line to be displayed in different colors, each of which indicate how fast the vehicle should be traveling over the particular portion of the race track bearing the color. For example, a red color may be used to indicate where the vehicle should decelerate, and yellow color may indicate where the speed of the vehicle should be held constant, and a green color may indicate where the vehicle should be accelerating. When changing from one color to another, the change may be gradual and smooth.

Figure 2:
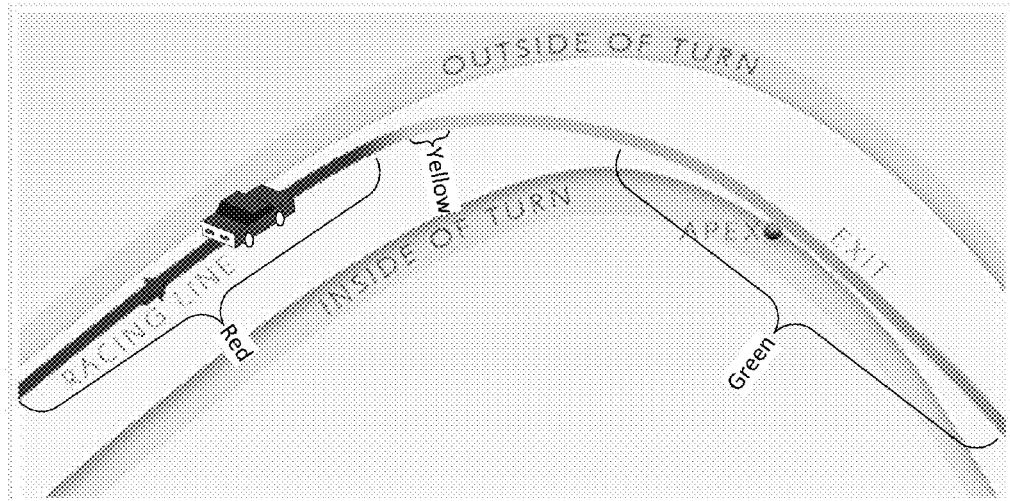
FIGS. 2 and 3 illustrate examples of displays that may be generated by the display system.
Figure 3:
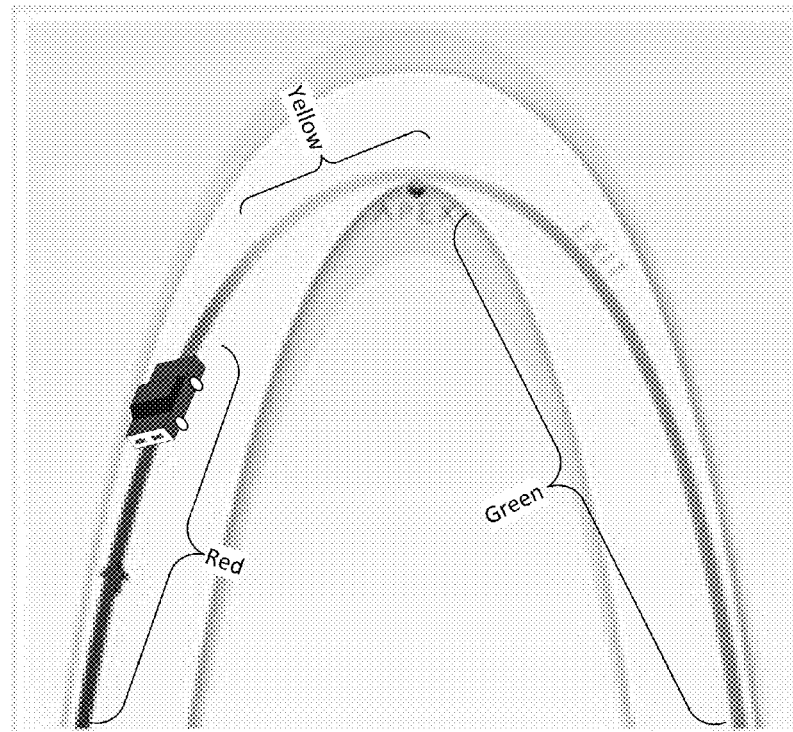

FIGS. 2 and 3 illustrate examples of displays that may be generated by the display system 117. FIG. 2 illustrates an example of an upcoming turn of approximately 90°, while FIG. 3 illustrates an example of an upcoming turn of approximately 180°. In each case, the color of the race line may change as indicated above and as shown in the figures.

The radar system 109 may be configured to detect obstacles in the pathway of the vehicle and to provide a warning when an object of a size of concern is detected in that pathway. The camera system 107 may in addition or instead perform this function. Information about such obstacles may be provided by the radar system 109 and/or the camera system 107 to the controller 111. In turn, the controller 111 may control the steering control system 119, the throttle control system 121, and/or the brake control system 123 to avoid any problematic obstacle. This may prevent the vehicle from steering into another vehicle on the track. Also, the displayed racing line can be adjusted to avoid obstacles.

The controller 111 may be implemented with a computer system configured to perform the functions that have been described herein for the controller 111. The computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may be part of a brake control system, a power steering system, an engine and/or transmission control system, a navigation system, and/or a vehicle ECU, or it could be a standalone ECU that communicates with the other systems using a vehicle CAN bus(s).

The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the vehicle race track driving assistance system may only control the steering, brakes, throttle, display, or any sub-combination of these. The vehicle race track driving assistance system may be used in an automobile, RV, motorcycle, watercraft, go-cart, military vehicle, and/or aircraft.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A vehicle race track driving assistance system comprising:
    a location tracking system that tracks the location of the vehicle;
    a memory for holding race track data indicative of the shape and location of the race track, including a turn on the race track;
    a steering control system that controllably steers the vehicle; and
    a controller that causes the steering control system to controllably steer the vehicle into the turn on the race track when the location tracking system and race track data indicate that the vehicle is approaching the turn, the steering being in an amount that is insufficient to cause the vehicle to navigate through the turn without deviating from the race track.

2. The vehicle race track driving assistance system of claim 1 wherein:
    there is a turning location on the race track at which the vehicle would normally initiate the turn to minimize its lap times on the track; and
    the controller causes the steering control system to controllably steer the vehicle before the vehicle reaches the turning location.

3. The vehicle race track driving assistance system of claim 1 wherein the steering by the steering control system can be overridden by a manual steering system.

4. The vehicle race track driving assistance system of claim 1:
    further comprising a throttle control system that controls a throttle of the vehicle; and
    wherein the controller causes the throttle control system to reduce the throttle of the vehicle when the location tracking system and race track data indicate that the vehicle is approaching the turn or to increase the throttle of the vehicle when the location tracking system and race track data indicate that the vehicle is exiting the turn.

5. The vehicle race track driving assistance system of claim 4 wherein the controller causes the throttle control system to reduce the throttle of the vehicle when the location tracking system and race track data indicate that the vehicle is approaching the turn and wherein the amount of reduction in the throttle is insufficient to ensure that the vehicle will not lose traction when making the turn.

6. The vehicle race track driving assistance system of claim 4 wherein:
the controller causes the throttle control system to reduce the throttle of the vehicle when the location tracking system and race track data indicate that the vehicle is approaching the turn;
there is a throttle location on the race track at which the vehicle would normally reduce its throttle before going into the turn to minimize its lap times on the track; and
the controller causes the throttle control system to reduce the throttle of the vehicle before the vehicle reaches the throttle location.

7. The vehicle race track driving assistance system of claim 4 wherein the controller causes the throttle control system to reduce the throttle of the vehicle when the location tracking system and race track data indicate that the vehicle is approaching the turn and wherein the reduction in the throttle can be overridden by a manual throttle.

8. The vehicle race track driving assistance system of claim 7 wherein the amount of the braking is insufficient to ensure that the vehicle will not lose traction when making the turn.

9. The vehicle race track driving assistance system of claim 7 wherein:
there is a braking location on the race track at which the vehicle would normally brake before going into the turn to minimize its lap times on the track; and
the controller causes the brake control system to brake the vehicle before the vehicle reaches the braking location.

10. The vehicle race track driving assistance system of claim 4 wherein the braking can be overridden by a manual brake or throttle.

11. The vehicle race track driving assistance system of claim 10 wherein the race track data is indicative of the altitude of each of the sequential series of locations on the race track.

12. The vehicle race track driving assistance system of claim 1:
further comprising a brake control system that controllably brakes the vehicle, and
wherein the controller causes the brake control system to brake the vehicle when the location tracking system indicates that the vehicle is approaching the turn.

13. The vehicle race track driving assistance system of claim 1 wherein the race track data is indicative of the longitude and latitude of a sequential series of locations on the race track.

14. The vehicle race track driving assistance system of claim 1 wherein the location tracking system includes a GPS system and a camera system and uses information from both to track the location of the vehicle on the race track.

15. The vehicle race track driving assistance system of claim 1 further comprising a display that displays an image of the vehicle superimposed on an image of the race track at the vehicle's location on the race track as the vehicle travels on the race track.

16. The vehicle race track driving assistance system of claim 15 wherein the display also displays a race line showing the optimum path of the vehicle to minimize race time.

17. The vehicle race track driving assistance system of claim 15 wherein the display also displays different portions of the race line in different colors, each color indicating how fast the vehicle should be traveling over the portion of the race line bearing the color.

18. The vehicle race track driving assistance system of claim 17 wherein one color indicates that the vehicle should reduce speed when traveling over the portion of the race line bearing the one color.

19. The vehicle race track driving assistance system of claim 17 wherein one color indicates that the vehicle should increase speed when traveling over the portion of the race line bearing the one color.

20. The vehicle race track driving assistance system of claim 17 wherein one color indicates that the vehicle should maintain its speed when traveling over the portion of the race line bearing the one color.

21. A vehicle race track driving assistance system comprising:
a location tracking system that tracks the location of the vehicle;
a memory for holding race track data indicative of the shape and location of the race track, including a turn on the race track;
a throttle control system that controls a throttle of the vehicle; and
a controller that causes the throttle control system to reduce the throttle of the vehicle when the location tracking system and race track data indicate that the vehicle is approaching the turn, the amount of reduction in the throttle being insufficient to ensure that the vehicle will not lose traction when making the turn.

22. The vehicle race track driving assistance system of claim 21 wherein:
there is a throttle location on the race track at which the vehicle would normally reduce its throttle before going into the turn to minimize its lap times on the track; and
the controller causes the throttle control system to reduce the throttle of the vehicle before the vehicle reaches the throttle location.

23. The vehicle race track driving assistance system of claim 21 wherein the controller causes the throttle control system to increase the throttle of the vehicle when the location tracking system and race track data indicate that the vehicle is exiting the turn.

24. A vehicle race track driving assistance system comprising:
a location tracking system that tracks the location of the vehicle;
a memory for holding race track data indicative of the shape and location of the race track, including a turn on the race track;
a brake control system that controllably brakes the vehicle;
a controller that causes the brake control system to brake the vehicle when the location tracking system indicates that the vehicle is approaching the turn, the braking being an amount that is insufficient to cause the vehicle to navigate through the turn without deviating from the race track.

25. The vehicle race track driving assistance system of claim 24 wherein:
there is a braking location on the race track at which the vehicle would normally brake before going into the turn to minimize its lap times on the track; and
the controller causes the brake control system to brake the vehicle before the vehicle reaches the braking location.

* * * * *